United States Patent [19]

Wells

[11] Patent Number: 4,466,376
[45] Date of Patent: Aug. 21, 1984

[54] TRAFFIC CONE

[76] Inventor: Homer D. Wells, 3111 W. 6th Ave., Emporia, Kans. 66801

[21] Appl. No.: 428,099

[22] Filed: Sep. 29, 1982

[51] Int. Cl.³ ............................................... E01F 9/00
[52] U.S. Cl. ..................................... 116/63 P; 40/612; 116/63 C
[58] Field of Search ................. 116/63 C, 63 P, 63 R, 116/63 T; 40/606, 610, 612, 539; 229/22, 23 R, 34 R; 350/97; 404/6, 9-11; 248/DIG. 10, 364, 472

[56] References Cited

U.S. PATENT DOCUMENTS

| 622,494 | 4/1899 | Knobeloch | 229/34 R |
|---|---|---|---|
| 1,643,118 | 9/1927 | Hahn | 229/22 |
| 1,687,616 | 10/1928 | Huye | |
| 2,100,888 | 11/1937 | Vine | 229/22 |
| 2,787,073 | 4/1957 | Woolven | 41/11 |
| 2,935,238 | 5/1960 | Koehler | 229/22 |
| 2,991,699 | 7/1961 | Murray, Sr. | 88/79 |
| 3,442,247 | 5/1969 | Osterberg | 116/63 |
| 3,666,164 | 5/1972 | Nederveld | 229/23 R |
| 4,157,210 | 6/1979 | Mesman | 350/97 |
| 4,256,050 | 3/1981 | Barnard | 116/63 C |
| 4,317,617 | 3/1982 | Charlton | 116/63 P |

FOREIGN PATENT DOCUMENTS

| 100094 | 10/1964 | Denmark | 116/63 T |
| 1421512 | 11/1964 | France | 116/63 C |

Primary Examiner—Charles Frankfort
Assistant Examiner—W. Morris Worth
Attorney, Agent, or Firm—Litman, Day & McMahon

[57] ABSTRACT

A foldable traffic warning cone utilizes a first panel of generally fan shape having triangular faces joined at adjacent sides along face folding lines. The first panel has opposite free sides which interconnect to fold the first panel into an upright polygon. The triangular faces of the first panel have bottom ends with extending flaps which cooperate with a second panel having a number of sides commensurate to the number of faces on the first panel and which forms a base for the first panel. The second panel has wings extending outwardly from each of the sides and which are foldable to provide a wall extending about the base. The wings also trap the flaps and thereby connect the upright polygon and the base together. The warning cone can be selectively folded and unfolded for use and storage.

4 Claims, 16 Drawing Figures

U.S. Patent  Aug. 21, 1984  Sheet 1 of 4  4,466,376
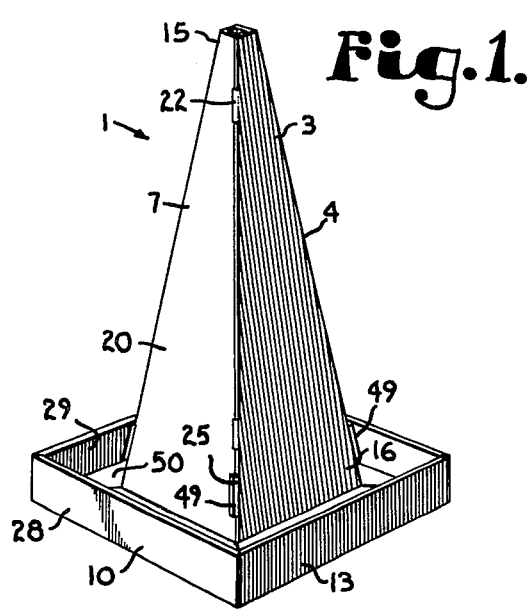
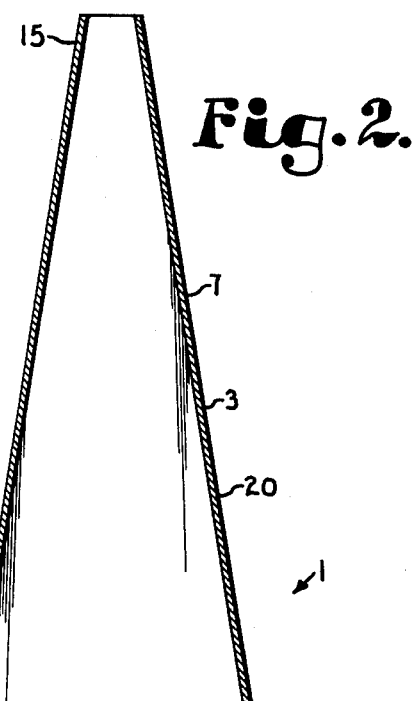
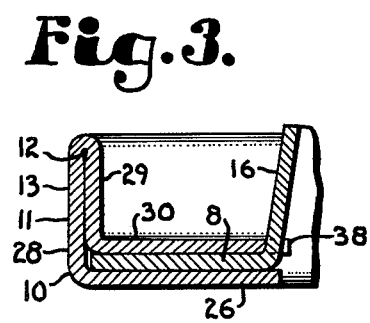
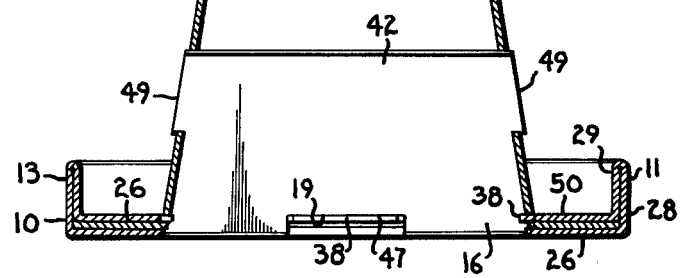
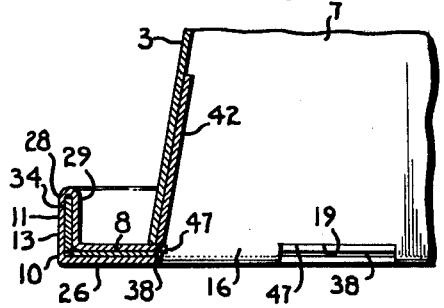

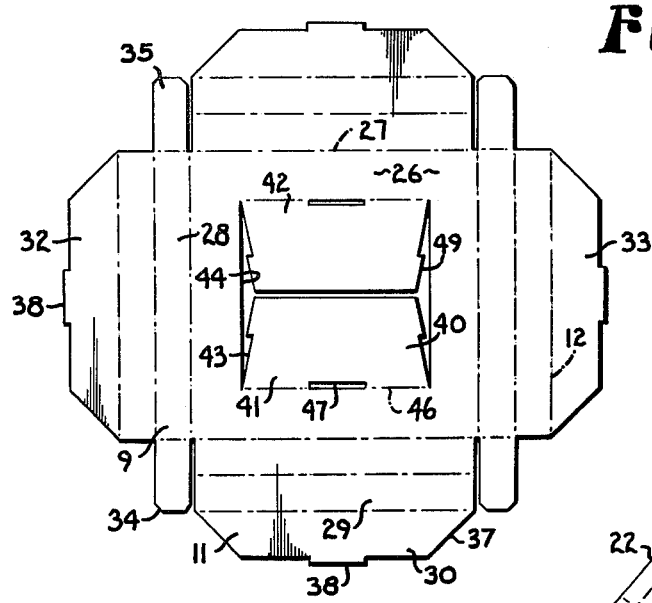
Fig. 6.
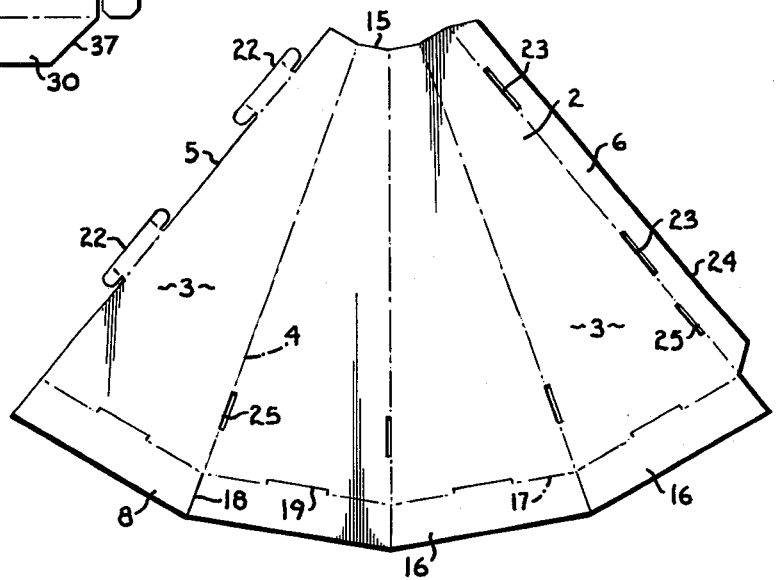
Fig. 7.
Fig. 8.
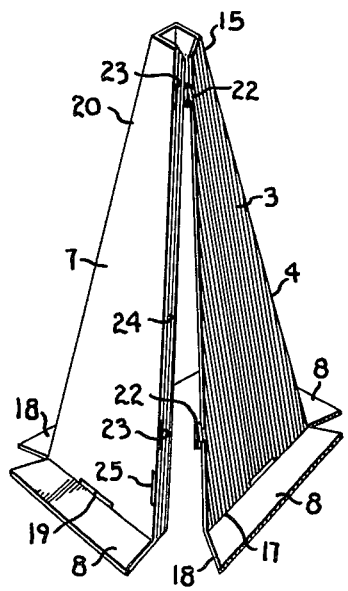
Fig. 9.
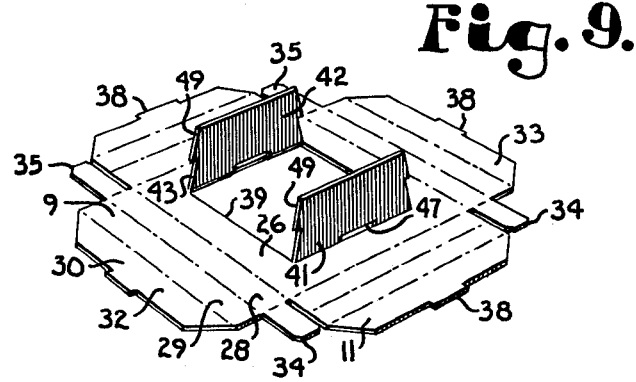

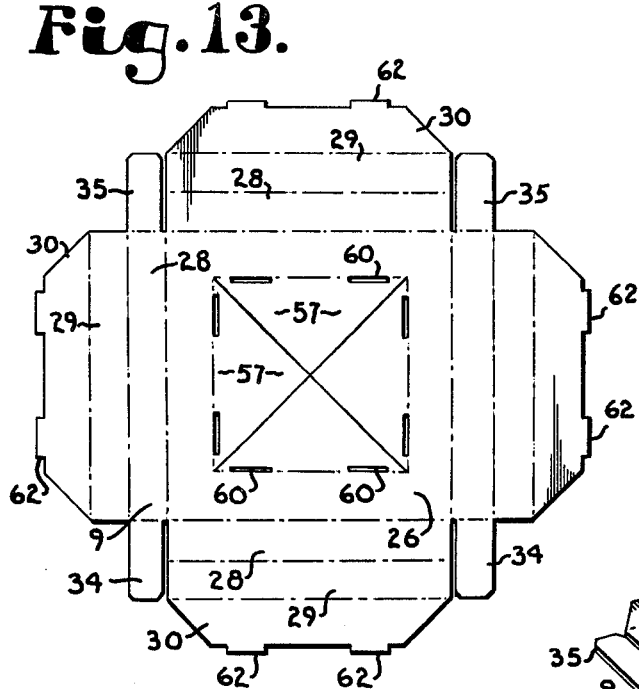
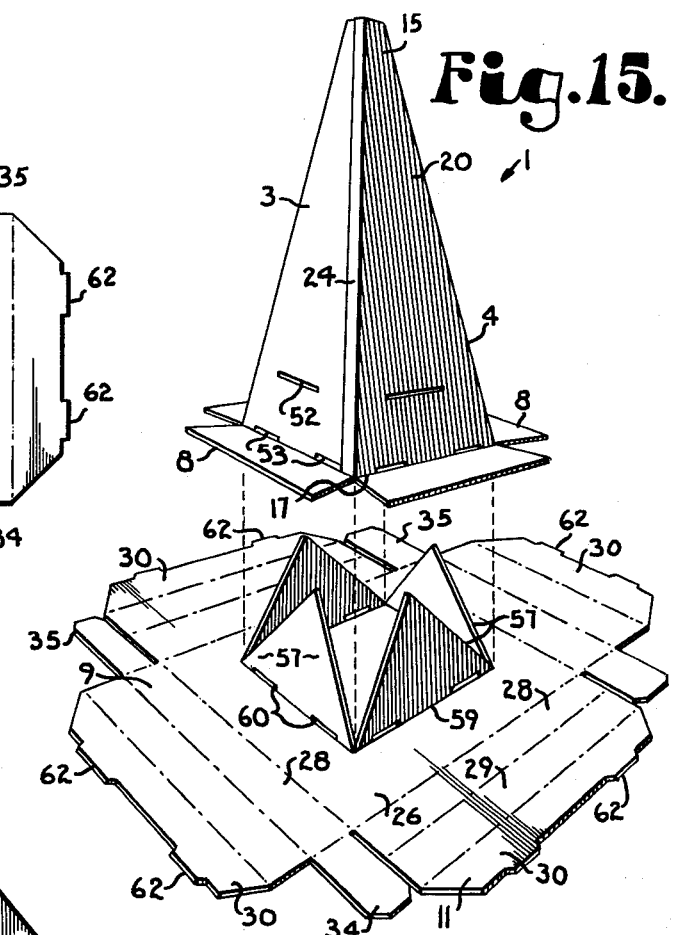
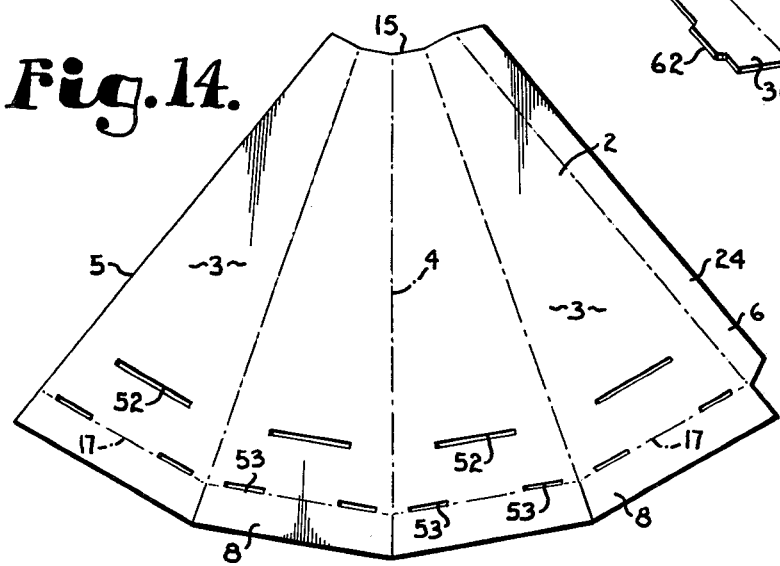
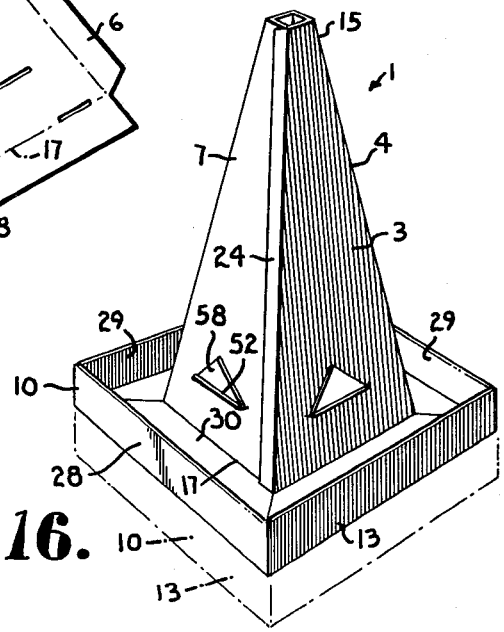

TRAFFIC CONE

This invention relates to a collapsible traffic warning device, and in particular, to such a warning device which is inexpensively made from flat sheets of material and which may be folded and unfolded for use and storage.

BACKGROUND OF THE INVENTION

Most traffic cones now in common usage are of a molded plastic material and are relatively expensive and expensive to replace. Moreover, the old cones require considerable storage space and thus are not readily adaptable for use by the average motorist who would otherwise want to carry traffic safety cones in the automobile trunk for use during accidents, to guide other motorists for highway obstructions or to warn of the presence of disabled vehicles.

OBJECTS OF THE INVENTION

In view of the above, the principal objects of the present invention are: to provide a foldable traffic warning cone which may be easily stored and assembled for use; to provide such a warning cone comprised of easily and inexpensively obtained paper or cardboard stock which is biodegradable when discarded; to provide such a warning cone having coated surfaces for resistance to weather and moisture degradation; to provide such a warning cone which is light in weight and may be easily assembled; to provide such a warning cone which may be brightly colored or finished to provide reflective surfaces; to provide such a warning cone having a base constructed to receive materials for weighting down the cone to resist overturning by high-winds; and to provide such a warning cone which is particularly well adapted for its intended purpose.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a foldable traffic warning cone embodying the present invention and is shown in an assembled condition.

FIG. 2 is an enlarged, longitudinal sectional view of the traffic warning cone.

FIG. 3 is an enlarged fragmentary view showing a portion of the traffic warning cone.

FIG. 4 is a fragmentary view showing the interconnecting portions of the warning cone.

FIG. 5 is a fragmentary, plan view of the warning cone.

FIG. 6 is a plan view of a base panel of the traffic warning cone and shown in an unfolded or unassembled condition.

FIG. 7 is a plan view of a first or upright polygon panel of the traffic warning cone and shown in an unfolded or unassembled position.

FIG. 8 is a perspective view showing the step of folding or erecting the polygon panel.

FIG. 9 is a perspective view showing a step of preparing the base panel for connection with the polygon panel of FIG. 8.

FIG. 13 is a plan view showing a base panel of the preferred embodiment.

FIG. 14 is a plan view showing the polygon panel of the preferred embodiment.

FIG. 15 is a perspective, assembly view showing the connection of the base and polygon panels of the preferred embodiment.

FIG. 16 is a perspective view of the preferred embodiment.

DESCRIPTION OF THE ALTERNATE AND PREFERRED EMBODIMENTS

Figure 10:
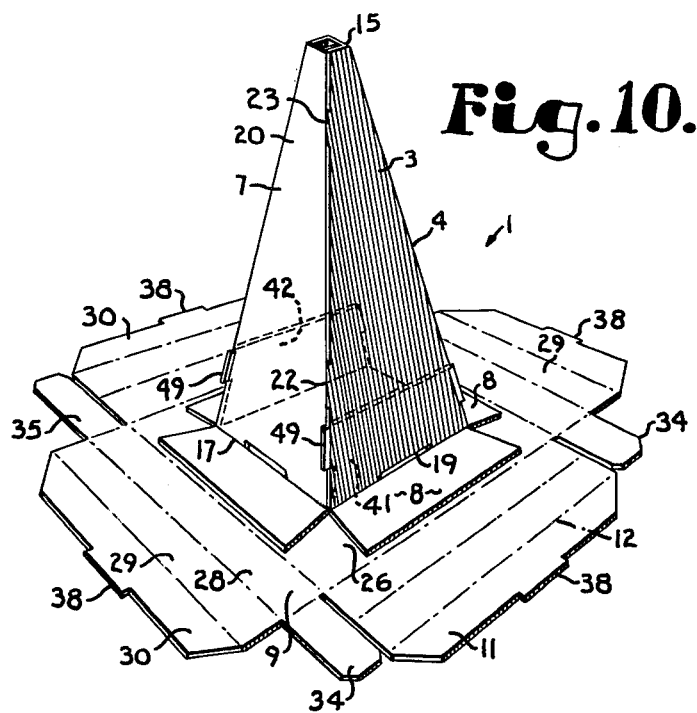
FIG. 10 is a perspective view showing additional steps of connection between the base and polygon panels.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 11:
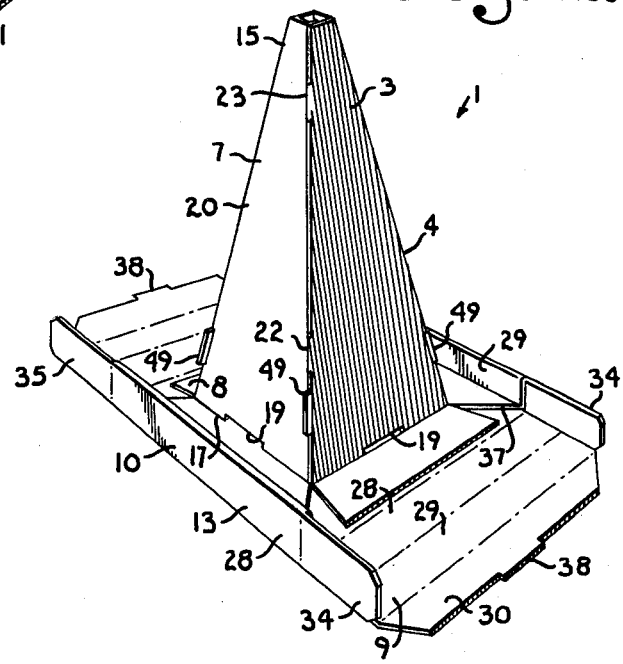
FIG. 11 is a perspective view showing an intermediate step of connecting the base and polygon panels.
Figure 12:
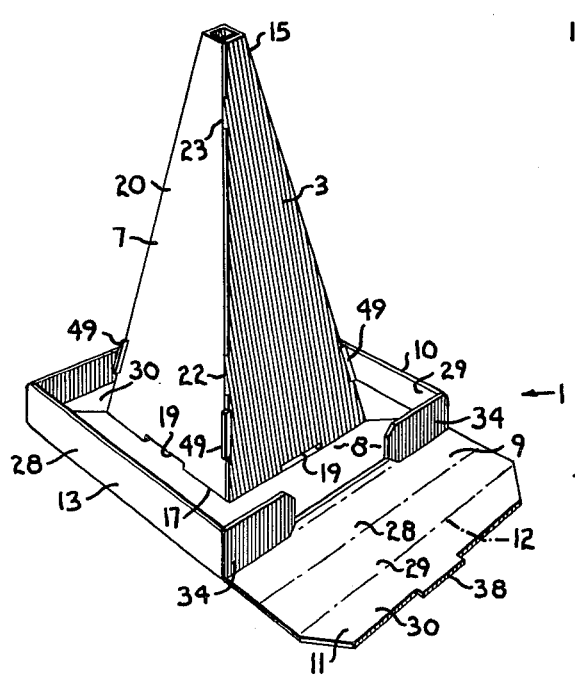
FIG. 12 is a perspective view showing substantial completion of assembly of the base and polygon panels.

Referring to the drawings in more detail:

The reference numeral 1 indicates a foldable traffic warning cone embodying the present invention. The warning cone 1 as shown in connection with FIGS. 1 through 12 constitutes an alternative embodiment whereas the warning cone 1 as shown in connection with FIGS. 13 through 16 inclusive comprises the preferred embodiment. The embodiments are substantially the same except for where indicated as different.

The traffic warning cone 1 generally comprises a first panel 2 of generally fan shape having triangular faces 3 joined at adjacent sides along face fold lines 4. The first panel 2 has opposite free sides 5 and 6, FIGS. 7 and 14, including means for interconnection whereby the first panel 2 is foldable into an upright polygon 7. The first panel 2 also includes a bottom end with flaps 8 extending therefrom.

A second panel 9, FIGS. 6 and 13, has a number of sides commensurate to the number of faces 3 on the first panel 2 and comprises a base 10 joinable with the polygon 7. The second panel 9 has wings 11 extending from the sides thereof and which are foldable along wing fold lines 12. The first panel 2 is joined to the second panel 9 during use by folding the wings 11 to provide a wall 13 extending about a bottom end of the upright polygon 7 and trapping the flaps 8 under the respective wings 11.

In the illustrated example, the fan shaped first panel 2 has a top or apex end 15 and a bottom end 16 with the free sides 5 and 6 extending therebetween. In the example shown in FIG. 7, the triangular faces 3 are four in number so as to form a four sided pyramid comprising the upright polygon 7. The first panel 2 is evenly divided into the four triangular faces 3 and adjacent the bottom end 16, each triangular face 3 joins a respective flap 8 via a flap fold line 17. The face fold lines 4 provide boundary edges between the triangular faces 3 and are colinear with radial slits 18 extending beyond the juncture of the face fold lines 4 and the flap fold lines 17. Slots 19 are centered on each of the flat fold lines 17 for connection to the wings 11 of the base 10 as described hereinbelow.

The free sides 5 and 6 include means for interconnection whereby the first panel 2 is foldable to comprise the four sided pyramid 20. In the illustrated example, the free side 5 includes spaced tabs 22 which fit into corresponding spaced slots 23 formed in an overlapping flap 24 at the other free side 6, FIG. 7. One of the face fold lines 4 provides edge separation between the flap 24 and the adjoining face 3. A lower slot 25 in the face fold line 4 between the flap 24 and the adjoining face 3 is positioned adjacent the bottom end 16 for a purpose later described.

To construct the pyramid, the first panel 2 is folded along the face fold lines 4 to dispose the faces 3 at right angles to each other and the flap 24 is bent over and the tabs 22 inserted into the slots 23. The flaps 8 are folded upwardly in preparation for mounting to the base 10.

In the illustrated example, the second panel 9, FIG. 6 is likewise of a flat cardboard material and which is stamped or otherwise cut into the subject arrangement. As the illustrated upright polygon 7 is a four sided pyramid, the panel 9 has a commensurate number of sides, such as four, thereby providing a rectangular central portion 26 and with the wings 11 extending outwardly from the four edges 27 thereof. The wing fold lines 12 commence at and the first of which forms the boundary between the central portion 26 and each wing 11. In the illustrated example, there are three progressive wing fold lines 12 dividing each wing 11 into a first portion 28, a second portion 29 and an outward wing flap 30. To connect the walls 13 together when the wings 11 are folded as set forth below, opposite wings 32 and 33 have arms 34 and 35 extending outwardly from opposite ends of the foldable first wing portion 28. The arms 34 and 35 are folded to form the wall 13 as the second panel 9 is folded to form the base 10 during assembly in order to hold the separate wall portions together. Additionally, the wing flaps 30, FIG. 6, have angled corners 37 to enable folding, FIG. 11, and a tab 38 protrudes from the edge of the wing flap 30 for engagement in the slot 19 when the wing 11 is folded over.

The central portion 26 includes a second engagement means 40 for connection of the polygon 7 to the base 10 which comprises in the illustrated example, first and second flaps 41 and 42 formed as by cutting from the second panel 9, leaving a central opening 39. Opposite sides 43 of the flaps 41 and 42 are spaced from a cut line 44 in the central portion 26 and are angled to fit into the upward convergence of the pyramid faces 3. A flap fold line 46 connects the respective flaps 41 and 42 to the remainder of the central portion 26 and a slot 47 is medially located at each flap fold line 46 for insertion of the wing tab 38 when the wing 11 is folded. The sides 43 include upper tabs 49 which fit into the lower slots 25 on the pyramid 20 and further connect the polygon 7 to the base 10.

In the example of the warning cone 1 shown in FIGS. 1 through 12, the first panel 2 is first formed into the upright polygon 7, or pyramid 20, by folding the panel 2 along the face fold lines 4 and locking the free sides 5 and 6 together by inserting the tabs 22 into the slots 23, FIG. 8. The flaps 8 are folded outwardly along the flap fold lines 17 in order for positioning flat against the second panel 9.

The second panel 9 is formed into the base 10 by first folding the flaps 41 and 42 upwardly, FIG. 9, and the pyramid 20 fitted onto the central portion 26 over the central opening 39. The tabs 49 are inserted into the lower slots 25 to affix the pyramid 20 the central portion 26.

Next, the wings 11 are folded inwardly by first folding each wing 11 at the wing fold line 12 between the first and second wing portions 28 and 29 to form the wall 13 and then folding the wing flap 30 over the pyramid flap 8 and inserting its tab 38 into the slot 19. The opposite wings 32 and 33 are preferably folded first, leaving the arms 34 and 35 extending therefrom and ready for folding within the wings 11 of the adjoining wings. The tabs 34 and 35 are folded inwardly, FIG. 12, and the wing first and second portions 28 and 29 folded thereover, thereby trapping the arms 34 and 35 within the wall 13 of the adjoining wing 11, FIG. 4, inhibiting the walls 13 from pulling apart.

After the pyramid 20 and the base 10 are assembled, the warning cone 1, FIG. 1, can be easily grasped and moved without any substantial possibility of the cone falling apart in use, except after the cone has been exposed to long conditions of adverse weather. Additionally, the walls 13 provide a well 50 for the base 10 into which sand or other weighting materials can be added to lend weight for high wind conditions and so that the cones 1 are not blown and scattered about by winds from large passing vehicles, such as trucks.

With respect to the embodiment shown in FIGS. 13 through 16, the arrangements of the first panel 2 and second panel 9 are very similar and connect together in much the same manner as that of the embodiment illustrated in FIGS. 1-12 with the exception that the free sides 5 and 6 of the first panel 2 merely include the flap 24 without tab and slot engagement means but instead the flap 24 is glued to the opposite free side 5. The lower slots 25 are not included and instead, horizontal slots 52 extend through each of the faces 3 at a distance spaced above the flap fold line 17. Additionally, two slots 53 extend through each of the flap fold lines 17.

The central portion 26 of the second panel 9 includes a central opening 55 with four triangularly shaped flaps 57 and which have pointed apexes 58. The flaps 57 are connected to the central portion 26 by respective flap fold lines 59 and two spaced slots 60 extend through the panel colinearly with each of the fold lines 59. Commensurately, the wing flap 30 has two spaced tabs 62.

Operation of the warning cone shown in connection with FIGS. 13 through 16 is substantially identical to that described in connection with FIGS. 1 through 12 with the exception that the pyramid 20 is formed using the adhesive flap to secure the free sides 5 and 6 together. In the connection between the pyramid 20 and the base 10, the four flaps 57 are folded to point upwardly and the respective apex ends 58 inserted through the horizontal slots 52. Additionally, the wing flap 30, when folded over as described in connection with FIGS. 1 through 12, inserts through the aligned slots 53 and 60 and forms two holding points for each side or face rather than only one.

It is to be understood that while certain forms of the present invention have been illustrated and described herein, it is not to be limited to the specific forms or arrangement of parts described and shown.

What is claimed and desired to secure by Letters Patent is as follows:

1. A foldable traffic warning cone comprising:

(a) a first panel of generally fan shape and having four triangular faces joined at adjacent sides along respective face fold lines;

(b) said first panel having a first free side and a second free side including a flap whereby said flap engages said first free side to fold said first panel into an upright, four sided pyramid;

(c) said first panel having an apex end and a bottom end with said bottom end having fold lines with slots therein, said fold lines extending normally to the longitudinal axes of said faces, thereby forming bottom flaps; and (d) a second panel of generally rectangular shape and comprising a base joinable with said pyramid; said second panel having four outwardly extending wings, each including a plurality of parallel fold lines and an outer wing flap portion with a tab; at least some of said wings respectively having arms protruding laterally therefrom;

(e) said second panel having a central portion with central arms swingable upwardly therefrom to expose a central opening and fit within said pyramid and connect thereto;

(f) said wings being foldable along said parallel fold lines to trap said bottom flaps therein and form upright walls with said tabs received in said slots and with opposite end openings receiving said wing arms and connecting said walls together, thereby securing said base to said pyramid.

2. A foldable traffic warning cone comprising:

(a) a first panel of generally fan shape having a plurality of faces thereon;
  (i) said faces being joined at adjacent sides along face fold lines;
  (ii) said first panel having opposite free sides including means for interconnection whereby said first panel is foldable into an upright polygonal pyramid;
  (iii) said first panel having a bottom end, said bottom end having fold lines and slots therein, said fold lines extending normally to longitudinal axes of said faces, thereby forming bottom flaps;

(b) a second panel having a number of sides commensurate to the number of faces on said first panel and comprising a base joinable with said polygonal pyramid;
  (i) said second panel having wings extending outwardly from each of said sides;
  (ii) said wings having outer edges including tabs; said tabs being insertable into said first panel bottom end slots;
  (iii) said first panel being joined to said second panel during use by folding said wings providing a wall extending about said pyramid, trapping said first panel flaps under said folded wings and inserting said wing tabs into said first panel slots; and
  (iv) said wall forming a well surrounding a bottom end of said pyramid; said well being adapted to receive weighting materials for weighting down said cone.

3. The traffic warning cone set forth in claim 2 wherein:
(a) said first panel includes four faces;
(b) said second panel is generally rectangular.

4. A foldable traffic warning cone comprising:
(a) a first panel of generally fan shape and having a plurality of faces joined at adjacent sides along respective face fold lines;

(b) said first panel having a first free side and a second free side including a flap whereby said flap engages said first free side to fold said first panel into an upright, polygonal pyramid;

(c) said first panel having an apex end and a bottom end with said bottom end having fold lines with slots therein, said fold lines extending normally to longitudinal axes of said faces, thereby forming bottom flaps;

(b) a second panel having a number of sides commensurate to the number of faces on said first panel and comprising a base joinable with said pyramid; said second panel having outwardly extending wings, each including a plurality of parallel fold lines and on outer wing flap portion with a tab; at least some of said wings respectively having arms protruding laterally therefrom;

(e) said second panel having a central portion with central arms swingable upwardly therefrom to expose a central opening and fit within said pyramid and connect thereto;

(f) said wings being foldable along said parallel fold lines to trap said bottom flaps therein and to form upright walls with said tabs received in said slots and with end openings receiving said wing arms and connecting said walls together, thereby securing said base to said pyramid; and
  (i) said wall forming a well surrounding a bottom end of said pyramid; said well being adapted to receive weighting materials for weighting down said cone.

* * * * *